United States Patent
Cunico et al.

(10) Patent No.: US 10,242,207 B2
(45) Date of Patent: Mar. 26, 2019

(54) TECHNOLOGY FOR CONFIDENTIALITY ADVISING

(71) Applicant: International Business Machines Corporation, Armonk, NY (US)

(72) Inventors: Hernan A. Cunico, Holly Springs, NC (US); Jonathan Dunne, Dungarvan (IE); Jeremiah O'Connor, Roscommon Town (IE); Asima Silva, Holden, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 110 days.

(21) Appl. No.: 15/268,551

(22) Filed: Sep. 17, 2016

(65) Prior Publication Data

US 2018/0082069 A1    Mar. 22, 2018

(51) Int. Cl.
| G06F 21/00 | (2013.01) |
| G06F 21/62 | (2013.01) |
| G06F 21/60 | (2013.01) |
| H04L 29/06 | (2006.01) |

(52) U.S. Cl.
CPC .......... G06F 21/62 (2013.01); G06F 21/604 (2013.01); G06F 21/606 (2013.01); G06F 21/6263 (2013.01); H04L 63/0227 (2013.01)

(58) Field of Classification Search
None
See application file for complete search history.

(56) References Cited

U.S. PATENT DOCUMENTS

| 7,124,438 | B2 | 10/2006 | Judge |
| 7,337,155 | B2 | 2/2008 | Yoshida |
| 8,769,605 | B2 | 7/2014 | Kaufmann |
| 9,762,583 | B2 * | 9/2017 | Guccione ............. H04L 63/101 |
| 2011/0173142 | A1 * | 7/2011 | Dasgupta ............ G06N 99/005 706/12 |
| 2012/0192261 | A1 * | 7/2012 | Blot-Lefevre ......... G06Q 20/02 726/10 |
| 2014/0172497 | A1 | 6/2014 | Kim |
| 2015/0149491 | A1 | 5/2015 | Redlich |

(Continued)

OTHER PUBLICATIONS

"Machine Learning Sets New Standard for Data Loss Prevention: Describe, Fingerprint, Lean," White Paper, 2010, http://eval.symantec.com/mktginfo/enterprise/white_papers/b-dlp_machine_learning.WP_en-us.pdf.

*Primary Examiner* — Eleni A Shiferaw
*Assistant Examiner* — Andrew J Steinle
(74) *Attorney, Agent, or Firm* — Anthony V. S. England; Reza Sarbakhsh

(57) ABSTRACT

For preventing unwanted information disclosure in a current electronic communication from a sender to a receiver of the current electronic communication, a risk score is assigned for the current electronic communication by a computer system applying an access control model based on historical electronic communications. The model generates the risk score responsive to identities of the sender and receiver and responsive to access control level and hierarchal position of at least one of the sender and receiver. The computer system blocks transmission of the current electronic communication from the sender to the receiver responsive to whether the risk score for the sender and receiver exceeds a predetermined threshold.

12 Claims, 7 Drawing Sheets

(56) References Cited

U.S. PATENT DOCUMENTS

2015/0156206 A1    6/2015  Redlich
2016/0104159 A1*  4/2016  Butterfield ........... G06Q 20/405
                                                  705/44
2017/0063765 A1*  3/2017  Herger .................... H04L 51/22

* cited by examiner

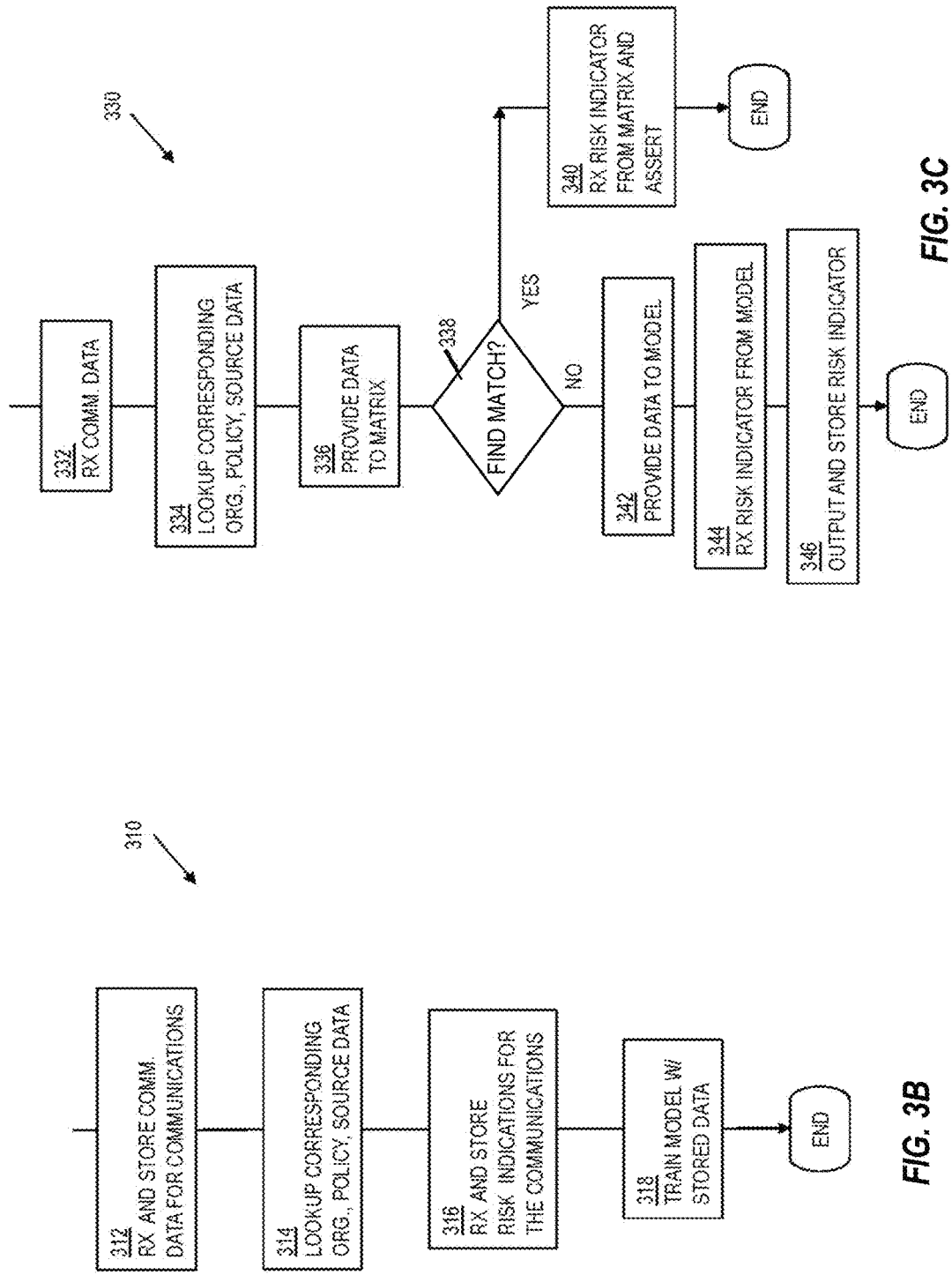

TECHNOLOGY FOR CONFIDENTIALITY ADVISING

FIELD OF THE INVENTION

The field of the present invention concerns computer implemented protection of computer accessible information to avoid unauthorized and unwanted disclosures in connection with electronic communications.

BACKGROUND

As used herein, "tuple" refers to an ordered list of elements that includes at least identification of a sender and at least one receiver in an electronic communication. As used herein, the term "electronic communication" includes communications such as email message communication, which may use an IMAP, POP3, SMTP or HTTP communication protocol, for example; instant message communication, for which there are many communication protocols, including XMPP and SIP, for example; and text message communication, which may use an SMS communication protocol, for example. Proprietary protocols also apply to electronic communication disclosed herein. Further, "electronic communication," as used herein, includes data transfers, which may use a FTP communication protocol, for example.

SUMMARY

In a method for preventing unwanted information disclosure in a current electronic communication from a sender to a receiver of the current electronic communication, a risk score is assigned for the current electronic communication by a computer system applying an access control model based on historical electronic communications. The model generates the risk score responsive to identities of the sender and receiver and responsive to access control level and hierarchal position of at least one of the sender and receiver. The computer system blocks transmission of the current electronic communication from the sender to the receiver responsive to whether the risk score for the sender and receiver exceeds a predetermined threshold.

System and computer program products relating to the above-summarized method are also described and claimed herein.

BRIEF DESCRIPTION OF DRAWINGS

Novel features believed characteristic of the invention are set forth in the appended claims. The invention itself, however, as well as a preferred mode of use, objectives and advantages thereof, will best be understood by reference to the following detailed description of an illustrative embodiment when read in conjunction with the accompanying drawings, wherein:

FIG. 3B is a flow chart illustrating aspects building an access control model by a computer system, according to embodiments of the present invention;

FIG. 3C is a flow chart illustrating aspects of a computer system generating an indicator for risk of unauthorized or unwanted disclosure, according to embodiments of the present invention;

DETAILED DESCRIPTION

Figure 1:
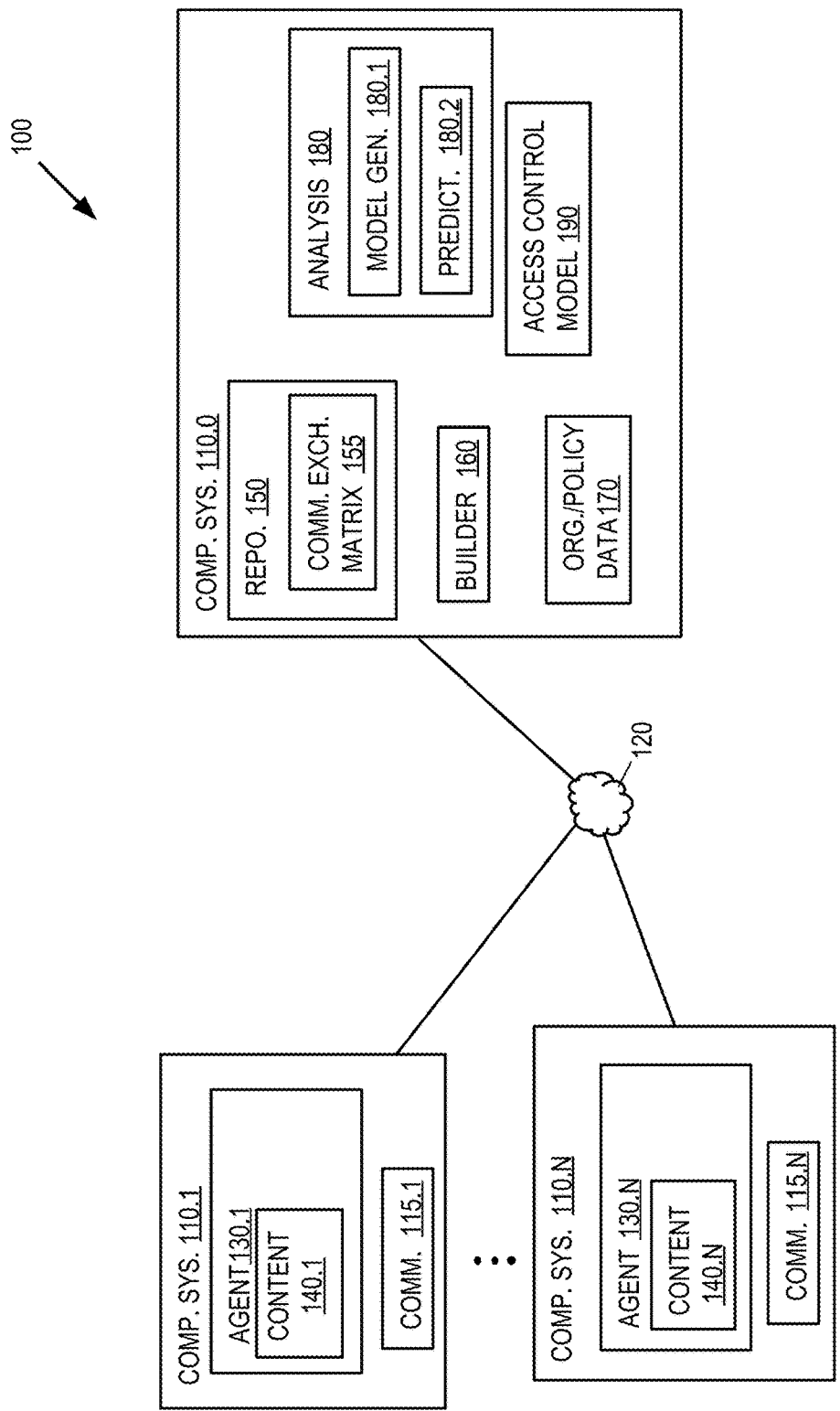
FIG. 1 illustrates a networked computer environment, according to embodiments of the present invention.

Detailed embodiments of the present invention are disclosed herein to illustrate claimed structures and methods. This invention may, however, be embodied in many different forms and should not be construed as limited to the exemplary embodiments disclosed herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

A method disclosed herein, which is performed by a computer system executing a program, alerts senders and receivers of electronic communications of information about to be disclosed that is potentially confidential or otherwise sensitive. The alerts work differently between the sender and receiver. In one embodiment of the present invention, the sender re-evaluates the content about to be disclosed responsive to a sender alert, whereas the receiver challenges the sender responsive to a receiver alert. For example, the receiver may communicate to the sender a message like, "I just received an alert, are you sure I should see the information you are about to send me?"

According to an embodiment of the disclosed method, a computer system uses semantic analysis to understand content about to be disclosed. The method accumulates a record for electronic communications, including content discussed, people involved and their roles, key concepts, level of details, frequency of communications, and duration of communications, from which the method creates an information exchange matrix. Using this, the method analyzes variations in the level of details between the information about to be exchanged and historic data. Further, the method accesses confidential information that can be used to compare against data about to be exchanged. Examples of potential confidential information include unannounced products and/or product names, internal project names, unannounced release dates, and unannounced features, level of details to be shared, other already well defined sharing rules and regulations, and customer specific sensitive data.

A model is provided that has a learning phase, which includes analyzing what parties are exchanging information as well as what type of content is exchanged between what parties. Confidence level of assertions by the model increases as more samples are processed. The modeling performs cognitive analysis and categorization for understanding the net of the information being exchanged. Cognitive analysis and categorization may be multi-dimensional and dynamically determined. Each implementation may be different. There may be analysis between the people (and their roles) exchanging information.

During an initial learning phase, the computer system learning includes observing and recording types of content shared over time and the channels involved. Over time there is a higher level of confidence, and a result can then be used to assert whether a certain type of content is being distributed via an unexpected channel or to an unexpected recipient may be refined.

In an example wherein the computer system receives, as training data, a set of historical data comprising instant messages and emails, for example, analysis of prior instant messages and emails may be conducted on the content to determine: a) sender, b) recipient, c) types of content communicated. Analysis of historical data may be used as an initial seed/cold start data for an access control model. For example, proportions may be determined of messages that disclosed documents and that were sent to individuals who did not have access to parent documents in storage systems where the disclosed documents were stored. The initial access control model may be rough and used for initial seed only. Thereafter, the model is refined through analysis of various factors to infer risk, as disclosed herein. That is, a level of risk is initially seeded through the observed data. Once the model gains understanding about what information is being exchanged and by whom, the model may calculate a risk score (also referred to herein as a "coefficient") representing a confidence level that certain content can or cannot be exchanged between two given parties. The system then automatically takes specific actions responsive to the risk score. As more data is added, the refined model derives risk asymptotically.

In an embodiment of the present invention, "protect" and "not protect" decisions detectable by the system are associated with historical messages used by a computer system model generator to train the access control model, or at least the system is able to infer such decisions after the fact. For example, the messages may include emails, instant messages, file transfers, etc., in a historical message repository, where each message is from a sender to at least one recipient and has content of interest, such as an attached document. The content of such a message may, instead of or in addition to being an attachment, be embedded in the body of the message. The message content is a member of a hierarchy of content, such as files, in computer accessible storage, wherein the message content has a parent in the hierarchy. For example, a user may have access to an individual document but not to a whole set of documents in a directory or set of directories on a Linux box or FTP server. In another example, a user may be authorized to see a particular article exists but not authorized to navigate to it. Or the user may be authorized only to read a parent article to which the particular article is attached, for example. According to an embodiment of the present invention, if a recipient of message content did not have authorization to access the parent, the message is deemed to be an observed instance of a "protect" decision for training the access control model. But if the recipient did have such an authorization, the message is deemed to be an instance of a "not protect" decision.

Embodiments of the present invention include installing an agent on all devices a user does business with, monitoring and analyzing the content of the information being handled/produced/consumed by the user, monitoring interactions with other parties and type of content being exchanged, creating an information exchange matrix, comparing data from the information exchange matrix against information currently being handled/produced/consumed by the user and calculating variations. If email or instant messaging (or the like) is used, the system also looks at distribution lists and analyzes recipient history and roles. The method includes comparing variations against historical data and uses a confidence system to determine risk. Statistical analysis of the communications exchange matrix may include analyzing frequency of electronic communications between respective senders and receivers, existing access control rules, sender job function, receiver job function, levels of detail of respective electronic communications, lengths of time intervals during which communications occur between respective senders and receivers, and variations in levels of detail of respective electronic communications.

Responsive to the collection and processing of information, the method includes using a confidence level to determine a risk, wherein the confidence level determines the type of action that follows. Some examples of actions include the following:

Low Risk—Do nothing
Low to Medium Risk—Alert Sender
Medium Risk—Alert Sender and Receiver
Medium to High Risk—Block Sender from disclosing information
High Risk—Block Sender from disclosing information and escalate to Sender's manager FIG. 1 illustrates an example computing environment 100, according to embodiments of the present invention. As shown, computing environment 100 includes computer systems 110.0 through 110.N connected via network 120, which may be public or private. Systems 110.0, etc. include modules, which may be program or hardware modules, configured to perform tasks for their own respective systems or for other systems or both.

Figure 2:
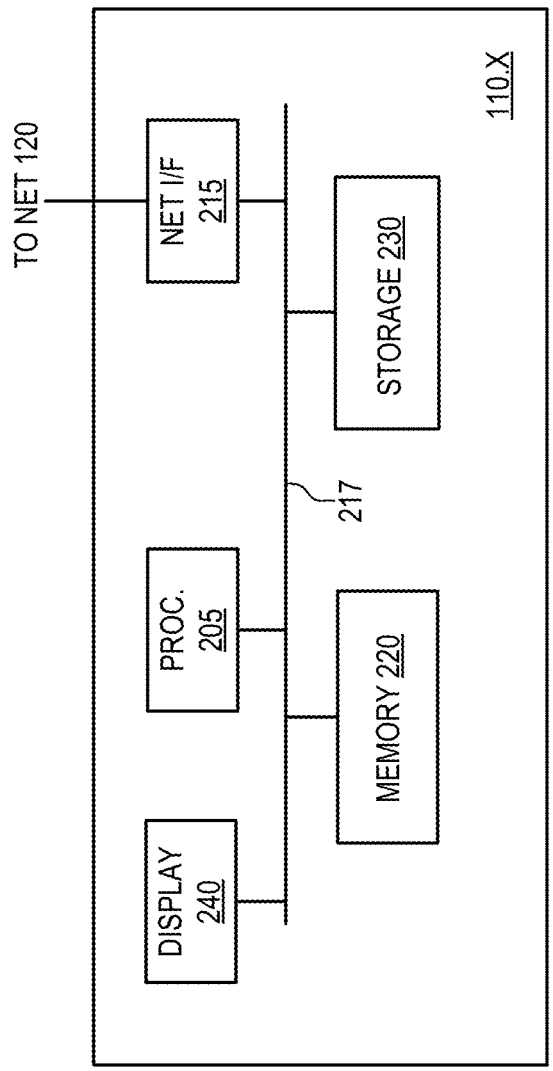
FIG. 2 is a block diagram of devices shown in FIG. 1, according to embodiments of the present invention.

FIG. 2 illustrates details of a computer system 200 suitable as computer systems 110.0, 110.1, etc., according to embodiments of the present invention, wherein system 200 includes at least one central processing unit (CPU) 205, network interface 215, interconnect (i.e., bus) 217, memory 220, storage device 230 and display 240 where system 200 may include an icon management module 260. CPU 205 may retrieve and execute programming instructions stored in memory 220 for applications, including module 260. Similarly, CPU 205 may retrieve and store application data residing in memory 220. Interconnect 217 may facilitate transmission, such as of programming instructions and application data, among CPU 205, storage 230, network interface 215, and memory 220. CPU 205 is representative of a single CPU, multiple CPUs, a single CPU having multiple processing cores, and the like. Additionally, memory 220 is representative of a random access memory, which includes data and program modules for run-time execution, such as model builder 103, according to embodiments of the present invention. It should be understood that system 200 may be implemented by other hardware and that one or more modules thereof may be firmware.

Referring again to FIG. 1, according to one or more embodiments of the present invention, an overview is illustrated of computing environment 100 for preventing confidential information disclosure. Computer systems 110.1 through 110.N include communication modules 115.1 through 115.N that send and receive electronic communications, such as for employees, contractors and vendors of a business enterprise, for example. Agents 130.1 through 130.N are installed on devices 110.1 through 110.N used by the senders and receivers of the electronic communications. Each agent 130.1 through 130.N has a respective one of content modules 140.1 through 140.N (also referred to herein as simply "content modules") configured to dynamically monitor and analyze electronic communications sent and received by its respective system 110.1 through 110.N. Each content module, such as module 140.1, for example, is further configured to dynamically select data about the electronic communications ("communication data") and to transmit the selected data to computer system 110.0 for storage on repository 150. Communications data that a content module such as module 140.1 selects and sends for repository 150 includes electronic communication addresses of users who are the sender and recipient(s) of each electronic communication, as well as date, subject, and content of each electronic communication, or at least data about the content, according to one or more embodiments of the present invention.

For example, for a user on computer system 110.1 who is composing or editing a message or data transfer via a digital communication application 115.1, e.g., email application, data transfer application, word processing application, social media application, etc., content module 140.1 analyzes content about to be disclosed and controls whether it is disclosed. A first way of analyzing the content, according to an embodiment of the present invention, may include semantic analysis. Other ways of content analysis are provided in other embodiments of the present invention. Content module 140.1 has access to identifying data in data 170 that includes identifications of sensitive information, which includes unannounced products, unannounced product names, internal project names, unannounced release dates, unannounced features, and customer specific sensitive data. Content module 140.1 dynamically collects, extracts, and categorizes communication data to be transferred in a message or data transfer, including sender/receiver addresses (and, optionally, names), key concepts of message/data transfer content and identification of sources of data (such as network addresses), which module 140.1 does at least partly in response to matching message/data transfer content with sensitive data identification in data 170.

A matrix builder module 160 is provided on computer system 110.0 and is configured to receive communications data from content modules 140.1 though 140.N and to organize and store it in at least one data structure 155 of repository 150, which may be on system 110.0 or may be on a remote system that communicates with system 110.0 via a network such as network 120. In alternative embodiments of the present invention, content modules 140.1 through 140.N are configured to perform some or all of the actions described herein for matrix builder module 160. The least one data structure 155, which may be a relational database or other data structure, provides the received communication data in an organized structure (a "communications exchange matrix") and provides communication of the received data to an analysis module 180. That is, the communications exchange matrix 155 identifies for analysis module 180 individual aspects of received communications data, such as date, subject, content and user data for respective electronic communications, and may also aggregate these individual aspects responsive to queries by analysis module 180. Thus, the historical collection 155 of communications data on repository 150 may, for example, provide a record of content and historical frequency and duration of electronic communications among users.

Data 170 is accessible by computer system 110.0 in least one data structure, such as a relational database or other data structure. Data 170 includes organization data describing organizational structure of the business entity for which electronic communications occurs via computer systems 110.1 through 110.N. This includes data describing a hierarchy of the organizational structure, as well as names of employees, contractors and vendors and their electronic communications addresses, job functions, and positions in the organizational hierarchy.

Organization data of data 170 also includes policy data that identifies types of content and sources of content included in electronic communications and that defines access control policies relating to the types of content in electronic communications and access control policies relating to accessing the data sources, including access control levels ("ACL's") assigned to respective data sources, i.e., authorization levels that are required in order to access respective data sources.

Data 170 may be on system 110.0 or may be on a remote system that communicates with system 110.0 via a network such as network 120. Data 170 may be in repository 150, although it is not shown there in the illustrated instance.

Regarding each communication for which it receives communications data, matrix builder module 160 also accesses data 170, selects items thereof and stores the selected data items in communication exchange matrix 155. In particular, matrix builder module 160 stores, for each electronic communication, further identifications of sources of any content included with the communication, features of access control policies relating to the data source(s) of the content and relating to the communication, and names of sender and receiver(s) and their electronic communications addresses, job functions, and positions in the organizational hierarchy. Thus, due to activity performed by matrix builder module 160, communication, organizational, policy and source related data for respective communications are stored in matrix 155.

Analysis module 180 includes a model generation module 180.1 configured to generate an access control model in module 190 that module 180.1 stores on computer system 110.0, or at least in a storage location accessible by computer system 110.0. (Model in module 190 may be stored in repository 150, although it is not shown there in the illustrated instance.) For model building, matrix builder module 160 is also configured to operate in a model building mode in which it is configured to also receive outcomes of protect/not protect events or other such risk indication events that occurred for each electronic communication, i.e., historic risk indications 308 that the content of the particular communication should be protected or not protected. Such a risk indication designates whether a communication can be safely sent, i.e., sent without unwanted or unauthorized disclosure. The risk indication may be defined by categories. For example, a "protect" risk indication may signify that a communication cannot be safely sent without unwanted or unauthorized disclosure, whereas a "not protect" indication may signify that a communication can be safely sent. A categorical risk indication may include more than simply two categories, such as high, medium and low risk of unwanted or unauthorized disclosure. The risk indication may also be defined as a continuum, such as a probability from 0 to 100% that a communication will cause an unwanted or unauthorized disclosure. Matrix builder module 160 is configured to store received risk indications on computer system 110.0, such as in matrix 155 or at least in a storage location accessible by computer system 110.0.

Module 180.1 generates an access control model in module 190 by analyzing i) the historical communications data stored in matrix 155 that was received from content modules 140.1 through 140.N, ii) other data stored in matrix 155, such as the organizational, policy and source related data from data 170 that was received from matrix builder module 160 and iii) past risk indications 308 stored in matrix 155 that occurred for each electronic communication and that were obtained by initial seeding or otherwise. Details of model in module 190 and model building, according to an illustrative embodiment of the present invention, will be explained in connection with descriptions of other Figures herein below.

Analysis module 180 also includes a prediction module 180.2 that is configured to look up a risk indication in communication exchange matrix 155 responsive to receiving communication data for a current communication. Details will be explained in connection with descriptions of other Figures herein below, according to an illustrative embodiment of the present invention. Alternatively, or additionally, module 180.2 is configured to provide to the access control model in module 190, responsive to receiving communication data for a current communication, predetermined communication, organizational, policy and source related data for the individual communication, some or all of which data may be stored in matrix 155. (Module 180.2 may provide this by passing the data or pointing to the data.) Prediction module 180.2 is further configured to provide a request for the model in module 190 to generate a risk indication for the communication responsive to the data that module 180.2 provides to the model in module 190 for the individual communication. Prediction module 180.2 is further configured to receive the risk indication back from the model in module 190 and store it in matrix 155 in association with the communication, organizational, policy and source related data for the individual communication that module 180.2 provided to the model in module 190 for generating the risk indication. Details will be explained in connection with descriptions of other Figures herein below, according to one or more illustrative embodiments of the present invention.

Figure 4:
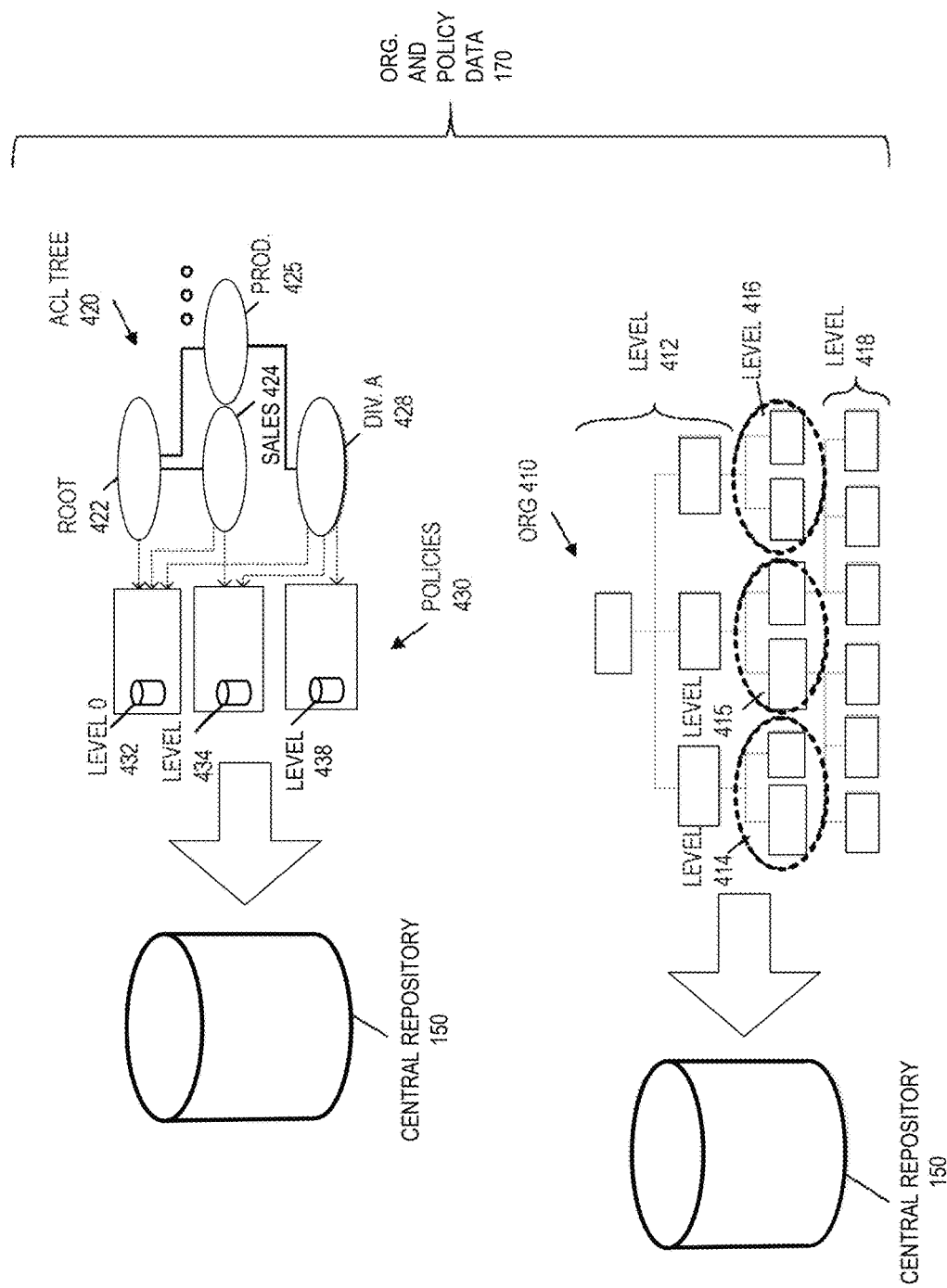
FIG. 4 illustrates data obtained for storage in a communication exchange matrix, including structure and relationships of the data, according to an embodiment of the present invention.

Referring now to FIG. 4 together with FIG. 1, aspects are illustrated for data 170 from which builder 160 stores selected data in communication exchange matrix 155, according to an embodiment of the present invention. Some parts of an organization for a business entity are shown as nodes in an ACL tree structure 420 that illustrates an ACL hierarchy of the parts, namely a root node 422, sales node 424, production node 425 and division A node 428. As can be seen by branches between some of the nodes, root node 422 is at the top of hierarchy 420. Sales node 424 and production node 425 are immediately below and connected to root node 422 above. Division A node 428 is immediately below and connected to production node 425 above. Root node 422 is thus defined as being at a highest level in the organization, e.g., level 0, while sales 424 and production 425 are at a next level, e.g., level 1, and Division A 428 is at a next level, e.g., level 2. (As indicated by the ellipse beside production node 425, at least one additional node exists at level 1 and is not shown.)

Access control policies 432, 434 and 438 are shown for the three levels of the organization, according to an embodiment of the present invention. (Other policies may exist that are not shown in this example.) As can be seen by the connections between certain individual or groups of organizational nodes 422, 424, etc. in tree 420 and certain ones of the boxes around policies 432, 434, etc., level_0 432 policies 1 and 2 apply to root 422, sales 424, production 425 (and at least one other node not shown) and division A 428. Level_1 434 policy 3 applies to sales 424, production 425 (and at least one other node not shown) and division A 428. Level_2 438 policy 4 applies to Division A 428. (In an alternative embodiment, access control policies of levels 432, 434 and 438 may be for respective departments/offices of the organization, rather than for levels. For example, policy 434 may be for sales 424, rather than for sales 424 and production 425, etc. Alternatively, some access control policies may apply to particular levels 432, 434 and 438, while others apply to particular departments/offices. In addition, or alternatively, some access control policies may apply to particular positions or job functions.)

Respective policies define access control rules that apply to particular parts of the organization, e.g., particular parts indicated by the connections shown in FIG. 4 and described above, according to embodiment of the present invention. For example, certain types of documents within the organization may be designated, upon creation or editing, as belonging to or being associated with a certain part, level or sublevel of the organization. Policy 1 may define a general access rule that prohibits persons who are assigned to a part of the organization at one level or sublevel in the organizational hierarchy from having access to information belonging to a higher level or sublevel of the hierarchy, unless exceptions apply, as defined in other policies. Policy 1 may define access level codes for the levels in the organizational hierarchy. Policy 1 may also define a general access rule, for example, establishing that a message belongs to the lowest level and sublevel of the organization to which any original message recipient belongs, unless exceptions apply as defined in other policies. Policy 1 may also, for example, define sublevels within the root 422, sales 424, production 425 (and at least one other node not shown) and division A 428 parts of the organization and associated access sublevel codes, and may define positions and job functions associated with the sublevels (and also define their access sublevel codes) of those parts of the organization. Policies 2, 3 and 4 may define exceptions to policy 1, for example, such as positions and job functions in a lower level of the organization that have access to documents and messages belonging to particular, higher levels. This may include exceptions based on risk scores defined herein below. In particular, access control policies 1 and 2 are shown for root 422, policy 3 is shown for sales 424, production 425, etc. and policy 4 is shown for division A 428, as can be seen by respective boxes around certain ones of the policies.

Rather than defining types of information that belong to particular parts of the organization, access control policies may alternatively, or in addition, define access control rules that apply to particularly identified sources of information, according to an embodiment of the present invention, such as particular repositories, for example, which may be repositories in repository 150 or elsewhere. A policy may define an access rule that requires a user to have certain ACL authorization in order for the user to access a particular repository. For example, a policy may define an access rule wherein an ACL authorization is automatically assigned for a user based on the user's job function, for example. In another example, a policy may define an access rule, wherein in order to access a particular repository a user must have a predetermined classification that concerns the user's purpose for accessing the repository, where the classification may be assigned by an administrator of the repository. In some instances, the classification assignment may require approval from an individual having a certain assigned ACL authorization within the organization.

In the bottom portion of FIG. 4, additional details are shown for a business entity organizational tree structure 410 that has entities corresponding to ACL nodes 422, 424, etc.

and their related policies shown in the top portion of FIG. 4, according to an embodiment of the present invention. Specifically, entities (sometimes referred to as "departments" or "offices") of organizational tree 410 are shown in the bottom portion of FIG. 4. In the illustrative embodiment of organizational tree 410 that is shown, four entities are at the top of the hierarchy represented, level 412. These may be, for example, offices for a president and three vice presidents. The offices of level 412 in organizational tree 410 correspond to ACL tree 420 root node 422 and level 0 policies 432 shown at the top of FIG. 4 and described herein above, according to an embodiment of the present invention.

At a next level down from level 412 in organizational tree 410 are levels 414, 415 and 416. Level 414 may include, for example, forecasting and sales departments reporting to the office of a vice president of marketing in level 412, for example. Level 415 may include, for example, manufacturing and purchasing departments reporting to the office of a vice president of production in level 412, for example. Level 416 may include, for example, accounting and treasury departments reporting to the office of a vice president of finance in level 412, for example. The offices of levels 414, 415 and 416 in organizational tree 410 correspond to ACL tree 420 nodes 424, 425, etc. and level 1 policies 434 shown at the top of FIG. 4 and described herein above, according to an embodiment of the present invention. At a next level down from level 414, 415 and 416 in organizational tree 410 is level 418. Level 418 may include, for example, some departments reporting to departments within level 415, for example.

The structure of organizational tree 410 particularly described herein above, with its entities in levels 412 through 418, is not intended to be limiting. Rather, the structure is intended merely to provide an example illustrating that entities such as offices, departments and the like may be organized in a hierarchy of levels and that these levels or individual entities or groups of entities may correspond to nodes in an ACL tree and associated ACL policies. Within the entities shown in organizational tree 410, individuals are assigned positions and job functions. Stored in data 170 of FIG. 1, are individual names electronic communication addresses, positions, job functions, departments/offices and the relations of each of these parameters to nodes of an ACL hierarchy and policies that correspond to the ACL nodes. Individuals are assigned default ACLs according to the access control policies as applied to their respective positions, job functions, and departments within the organization. However, their access to documents and messages may vary according to exceptions in the policies, such as based on risk scores defined herein below.

While access control policies have been described above for an embodiment of the present invention, it should be appreciated that other policies, may be used for practicing embodiments of the present invention and may still be within the scope of the present disclosure and claims. Likewise, other methods of applying such policies may be used than are explicitly described herein and may still be within the scope of the present disclosure and claims.

Figure 3A:
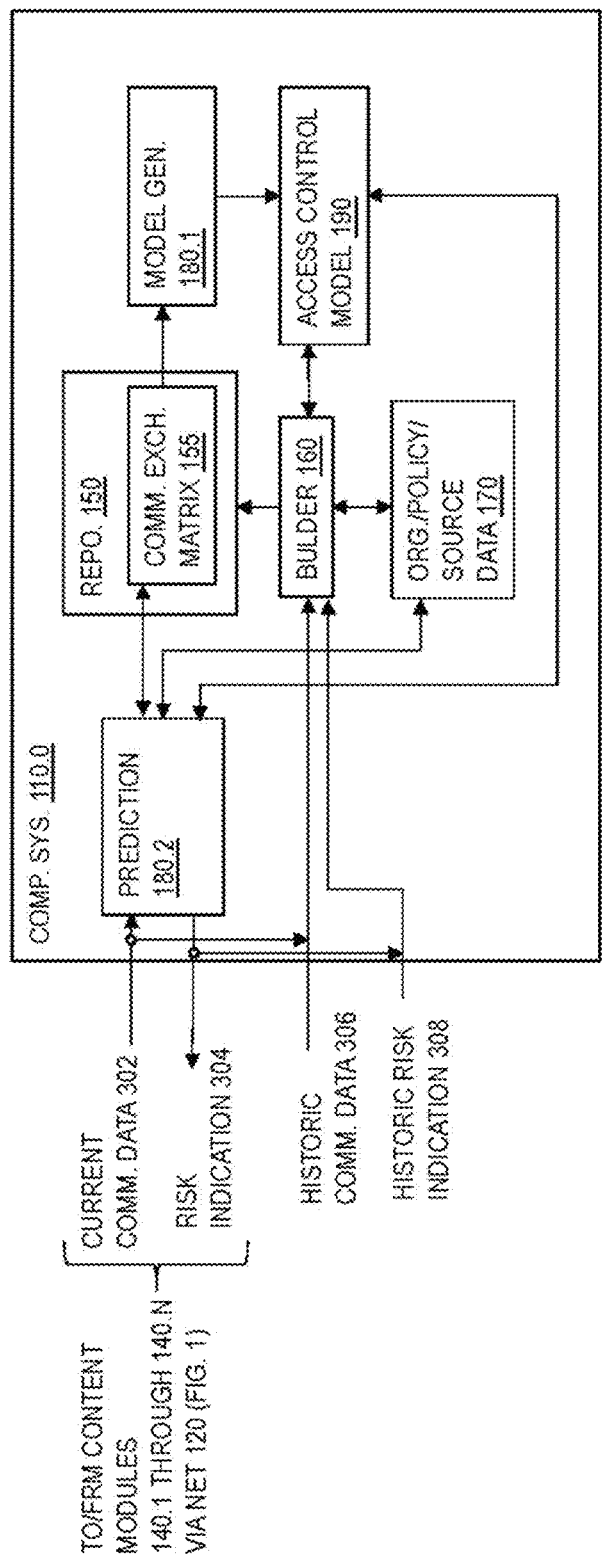
FIG. 3A is a block diagram illustrating aspects of communication and processing by a computer system, according to embodiments of the present invention.

Referring now to block diagram FIG. 3A and flow chart FIG. 3B together with FIG. 1, aspects of communication and processing by computer system 110.0 are illustrated, according to an embodiment of the present invention. These include processing 310 for model generation module 180.1 to generate an access control model in module 190, which is done responsive to receiving 312 historical communication data 306 sent to matrix builder module 160 by content modules 140.1 through 140.N, looking up 314 (or otherwise receiving) data such as organizational, policy and source data corresponding to predetermined parameters of the historical communication data 306, which matrix builder module 160 finds in data 170, for example, and receiving 316 past risk indications 308 inferred by matrix builder module 160 from the communications of the historical communication data 306, such as described herein above regarding initial seeding. Based on the data received at 312, 314 and 316, model generation module 180.1 generates an access control model in module 190 by training a user-specified type of model responsive to the received data. An example of model generation and application is provided herein below in connection with the descriptions of FIGS. 4 and 5.

Note that matrix builder module 160 stores received 312, 314 and 316 data in communication exchange matrix 155 for future reference, i.e., in order to potentially apply stored historical risk indications 308 to matching communications that subsequently occur, i.e., responsive to communication data 302, etc. for current communications that present unknown risks of unwanted or unauthorized disclosures.

Referring now to block diagram FIG. 3A and flow chart FIG. 3C together with FIG. 1, further aspects of communication and processing by computer system 110.0 are illustrated, according to an embodiment of the present invention. Once the access control model in module 190 is generated, matrix 155 or model 190 can provide current risk indications 304 to prediction module 180.2. That is, responsive to subsequent, current communication data 302 received 332 by prediction module 180.2 from content modules 140.1 through 140.N for respective communications, and responsive to prediction module 180.2 finding 334 organization, policy and source data 170 corresponding to predetermined parameters of communication data 302 for a given communication, prediction module 180.2 provides 336 a query based on the data received at 332 and 334 to apply previous model 190 via the model's previous results, i.e., provides 336 a query to lookup a corresponding risk indicator stored in matrix 155. Responsive to an affirmative match 338, prediction module 180.2 receives 340 the risk indicator from matrix 155, which prediction module 180.2 asserts as risk indicator 304 to the content module that provided the communication data 302 at 332, as will be explained herein below in connection with FIG. 6.

Figure 6:
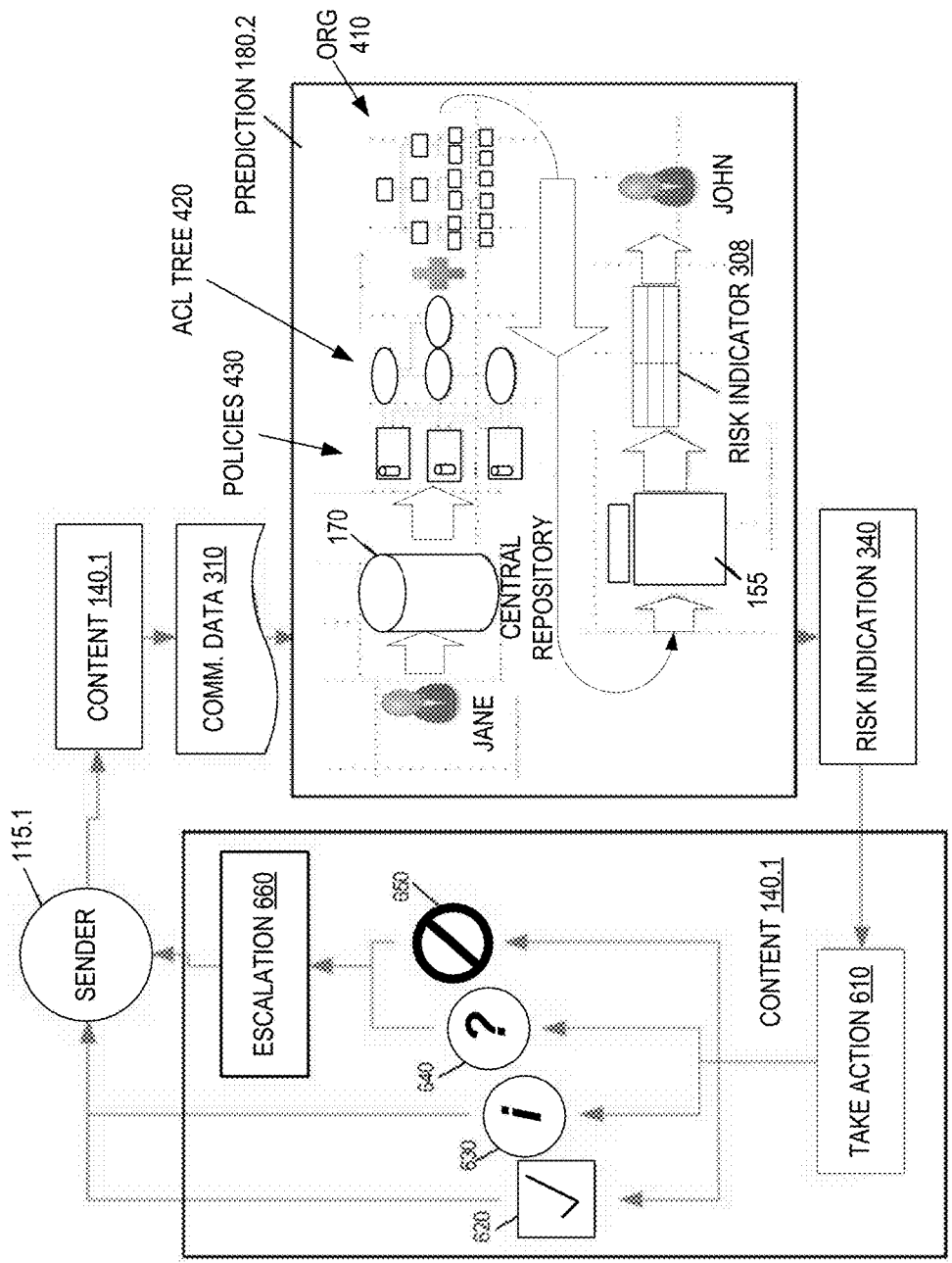
FIG. 6 illustrates aspects of data structures and actions performed by systems illustrated in FIGS. 1 through 5, according to embodiments of the present invention.

Responsive to no match, prediction module 180.2 provides the data received at 332 and 334 to model 190, which generates a risk indicator received 344 by prediction module 180.2, which prediction module 180.2 asserts 346 as risk indicator 304 to the content module that provided the communication data 302 at 332, as will be explained herein below in connection with FIG. 6.

Note that communication exchange matrix 155 stores as historic data 306, etc. for future reference the data provided to matrix 155 by module 180.2 in query 336, which module 180.2 received at 332 (current communication data 302) and looked up at 334. Also, in addition to outputting a current risk indication 304 received at 344 from model 190, module 180.2 also stores current risk indication 304 as a historical risk indication 308 in matrix 155 for future reference, i.e., in order to potentially apply for finding stored historical risk indications 308 to matching communications that subsequently occur, i.e., responsive to communication data 302, etc. for current communications that present unknown risks of unwanted or unauthorized disclosures.

Figure 5:
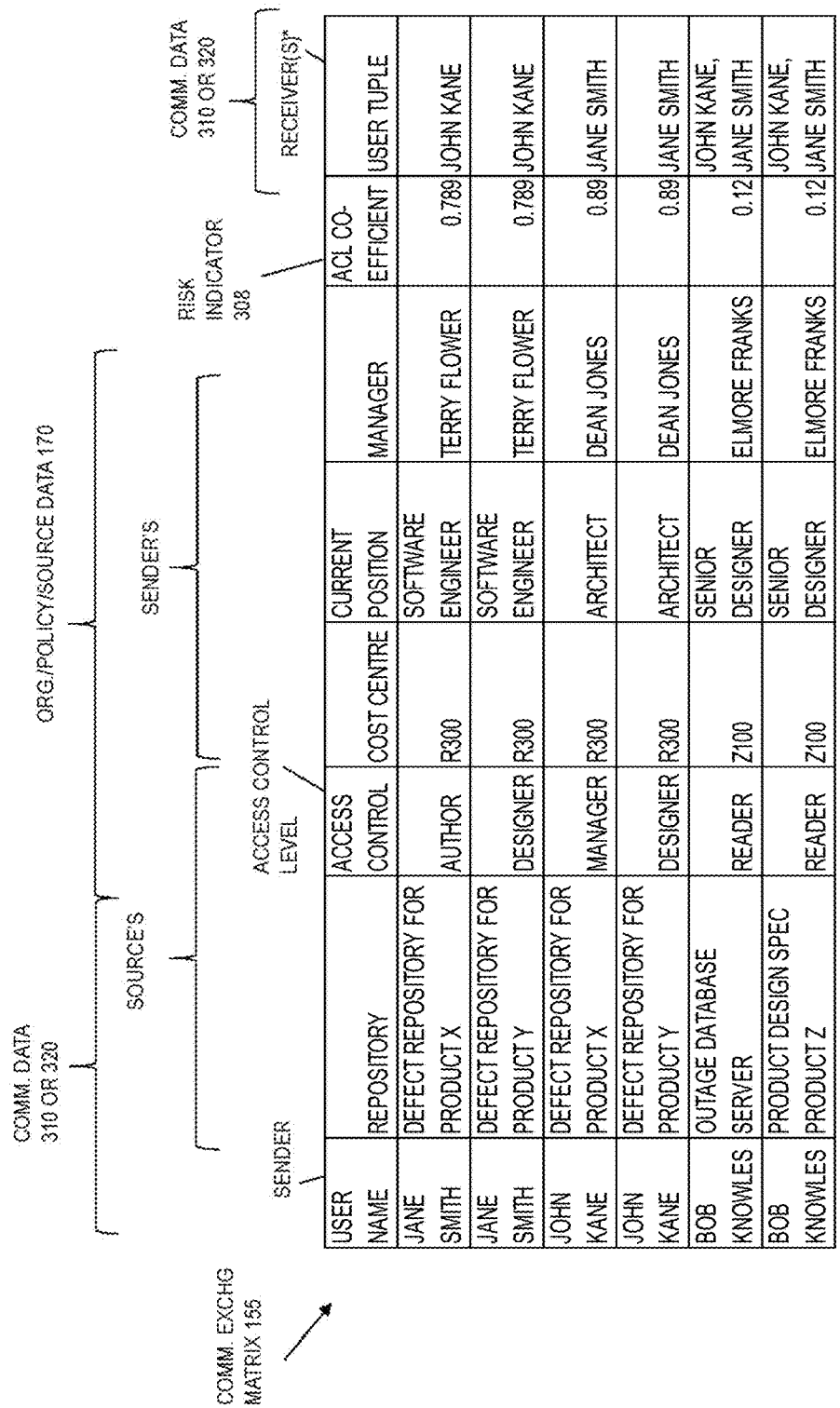
FIG. 5 illustrates aspects of a communication exchange matrix, according to an embodiment of the present invention.

Referring now to FIG. 5 together with FIGS. 1 and 3, aspects of communication exchange matrix 155 are illustrated, according to an embodiment of the present invention. Each row of matrix 155 is data for a single electronic communication. Each column represents a type of data for the rows of electronic communications. The first column has user names of persons who sent respective electronic communications of the respective rows, which may be directly indicated to matrix builder module 160 in received communication data 306 or 302, or may be indirectly indicated in received communication data 306 or 302 by communications addresses and which module 160 can use to look up names in data 170. The second column has names of repositories from which content was transmitted by the respective electronic communications, which may be directly or indirectly indicated in received communication data 306 or 302.

In the illustrated instance, the third column has ACLs required for access to the repositories of column 2, which are sources of content in the respective communications. Thus, the ACL's in the third column are for sources of information, according to the illustrated embodiment. In an alternative embodiment, one or more columns in matrix 155 indicate authorized ACLs of the respective senders, receivers or both. This may be in lieu of the third column in the illustrated example of FIG. 5, which is for ACL's required to access sources of information, or may be in addition to the third column of FIG. 5.

The fourth through sixth columns have cost centers, current positions, and managers for the senders, which module 160 can look up in data 170 from sender names or addresses. The eighth column has user names of persons who received respective electronic communications of the respective rows, which may again be directly indicated to matrix builder module 160 in received communication data 306 or 302, or may be indirectly indicated in received communication data 306 or 302 by communications addresses and which module 160 can use to look up names in data 170. The seventh column of matrix 155 in FIG. 5 has risk indicators 308 obtained by builder module 160 from past determinations or risk indicators 304 obtained by predictor module 180.2 from access control the model in module 190.

While matrix 155 illustrates a data structure according to an embodiment of the present invention, it should be appreciated that other data structures having different data elements may be used for practicing embodiments of the present invention and may still be within the scope of the present disclosure and claims, and that other methods of applying such data structures may be used than are explicitly described herein and may still be within the scope of the present disclosure and claims. Although the details of an example matrix 155 shown in FIG. 5 and described herein above are not necessarily exhaustive, the above details, nevertheless, help to particularly point out how model generation module 180.1 generates an access control model in module 190, according to an embodiment of the present invention.

As was previously stated, the model in module 190 is generated by model generation module 180.1 from historical communication data 306 sent to builder module 160 by content modules 140.1 through 140.N, and from data such as organizational, policy and source data 170 that matrix builder module 160 accesses based on matching the communication data 306. Inputs for generating the model in module 190 in a particular example, include names of repository or repositories that are sources of content in respective communications, ACLs required for access to the repositories, i.e., source ACL's, and hierarchical positions recorded (as described above) for the particular individuals who are sender/receiver for the message. (Alternatively, or in addition, ACL's assigned to the particular individuals who are sender/receiver for a communication may be inputs for generating the model in module 190, i.e., assigned as described above, responsive to access control policies for position, job function, and department of each individual.)

For generating the model in module 190, a training set of data requires the above inputs and past observations of risk indications 308 for the respective communications, which may be inferred by builder module 160 from the communications of the historical communication data 306, such as described herein above regarding initial seeding. In an example, model generation module 180.1 generates the following logistics regression analysis equation as access control model in module 190 from the training data:

$$\log(p/1-p)=1.4545-0.361(\text{Repository})+0.112(\text{Access Control})+0.455(\text{Cost Centre})-0.001(\text{Manager})+0.0022(\text{Current position})+0.432(\text{User Tuple})$$

For a particular set of (Repository, Access Control, Cost Centre, Manager, Current position, User Tuple) observations in one communication, the above equation may simplify to the following risk indicator, for example: $p=e^{\wedge}-0.361=0.697$, which indicates a moderately high likelihood of 69.7% that the content of the particular communication can be safely sent, i.e., sent without unwanted or unauthorized disclosure. (The risk indicator is also referred to herein as a "risk score" or an "ACL coefficient.") Alternatively, model module 190 is configured to output a classification, such as low, medium and high risk. This may be done by model generating module 180.1 generating a classification model, rather than a logistics regression model. Alternatively, model 190 may classify the likelihood values of a logistics regression model according to ranges, such as high risk=0-33% likelihood that the content of a communication can be safely sent, medium risk=34-67% likelihood that the content of a communication can be safely sent, and low risk=68-100% likelihood that the content of a communication can be safely sent. (Other models may be generated by model generation module 180.1.)

The details of matrix 155 illustrated in FIG. 5 and described herein above also help to particularly point out how prediction module 180.1 obtains a risk indication, according to an embodiment of the present invention. Referring now to FIGS. 1 and 6 along with FIG. 5, aspects of actions are shown in FIG. 6 that are performed by the system and data structures illustrated in FIGS. 1 through 5, according to an embodiment of the present invention, wherein a user, Jane is attempting to send information via communication module 115.1 to another user, John. Content module 140.1 associated with the Jane's communication module 115.1 extracts communication data 302 indicating sender and receiver(s) and additional information such as described herein above. Module 140.1 sends data 302 to prediction module 180.2.

Responsive to receiving communication data 302, prediction module 180.2 does a lookup in data 170 to find entries that correspond to particular aspects of communication data 302, e.g., finding in data 170 i) position, job function, and department of sender and receiver(s) responsive to communication addresses of sender (Jane) and receiver (John) in communication data 302, ii) repository name and required ACL authorization for the repository responsive to repository identification in communication data 302 and iii) content ACL restrictions, including required ACL authorization, responsive to content of the communication identified in communication data 302, such as content type and keywords.

The lookup in data 170 may include finding further identifications of sender and receiver(s), such as information to resolve identification ambiguity, including names of sender and receiver(s), for example. Identifications of the individuals who are sender and receiver(s) may be by names, electronic communications addresses, or the like. The identifications of the sender and receiver(s) provide a sender-receiver tuple, also referred to herein as a "user tuple."

Once prediction module 180.2 has obtained (from data 170) additional data that corresponds to communication data 302, module 180.2 looks for an entry in matrix 155 that matches these parameters (e.g., position, job function, department, repository, ACL and user tuple) to find a risk indication 304 in matrix 155 (or else provides parameters to the model in module 190) and receives a calculated risk indicator 304 in return, which it then forwards to one of agents 130.1 through 130.N, i.e., the agent of the sender. In an embodiment, module 180.2 also forwards risk indicator 304 for the current electronic communication to the agent(s) of the recipients(s). (In at least one embodiment, prediction model 180.2 may skip looking for matching entries in matrix 155 and go directly to providing parameters to the model in module 190.)

Content modules 140.1 through 140.N are configured to take actions 610 to protect information responsive to a received risk indication 304. In one or more embodiments of the present invention, a content module, such as module 140.1 for Jane in this example, allows a present communication to transmit 620 content to a sender in response to a low risk indication in received indicator 304. In response to medium risk, content module 140.1 initially blocks content of a current electronic communication and automatically sends an alert 630 to the agents of the sender and receiver of the current electronic communication, where the alert must be acted upon by the sender or receiver or both before content module 140.1 (for sender in this example) permits the communication to transmit its content. That is, in the illustrated instance, suppose John's agent is agent 130.2. Both the sender, Jane, and the receiver, John, communicate authorization to their respective content modules 140.1 and 140.2 responsive to receiving their respective alerts 630. Then, responsive to receiving John's authorization, Johns' module 140.2 sends authorization to proceed with transmission to Jane's module 140.1. Then Jane's module 140.1, upon receiving notification from John's module 140.2 that module 140.2 has received John's authorization, releases the communication and thereby allows it to be delivered to the receiver, John. Other embodiments are i) sender only, wherein the sender must authorize and there may be no alert 680 to the recipient, and ii) recipient only, wherein the recipient must authorize transmission and there may be no alert 630 to the sender. However, in some embodiments of recipient only alert, the recipient may challenge the sender (or alternatively, may be required to challenge the sender) to evaluate and authorize transmission before transmission may proceed. Likewise, in some embodiments of sender only alert, the sender may request (or be required to request) authorization before transmission may proceed.

In response to high risk, content module 140.1 initially blocks and automatically sends a request for a manager to approve release of content or otherwise escalate 660 in one implementation. Responsive to receiving manager approval, module 140.1 releases the communication, i.e., allows it to be sent to the receiver, John.

In another embodiment of the present invention, in response to a high risk content module 140.1 initially blocks communication 650 and sends a notice, such as to a manager and an authority having a security role for an escalation action 660. According to an embodiment of the present invention, blocking action 650 prevents Jane from sending the communication to John, but escalation action 660 permits the manager or security authority to send the communication to John. According to another embodiment of the present invention, blocking action 650 prevents Jane from sending the communication to John and escalation action 660 requires the manager or security authority to send the communication to someone other than John who has a higher ACL authorization.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

One or more databases may be included in a host for storing and providing access to data for the various implementations. One skilled in the art will also appreciate that, for security reasons, any databases, systems, or components of the present invention may include any combination of databases or components at a single location or at multiple locations, wherein each database or system includes any of various suitable security features, such as firewalls, access codes, encryption, de-encryption and the like.

The database may be any type of database, such as relational, hierarchical, object-oriented, and/or the like. A database product that may be used to implement the databases is IBM® DB2®, or other available database products. (IBM and DB2 are trademarks of International Business Machines Corporation, registered in many jurisdictions worldwide.) The database may be organized in any suitable manner, including as data tables or lookup tables.

Association of certain data may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a key field in each of the manufacturer and retailer data tables. A key field partitions the database according to the high-level class of objects defined by the key field. For example, a certain class may be designated as a key field in both the first data table and the second data table, and the two data tables may then be merged on the basis of the class data in the key field. In this embodiment, the data corresponding to the key field in each of the merged data tables is preferably the same. However, data tables having similar, though not identical, data in the key fields may also be merged by using AGREP, for example.

The host may provide a suitable website or other internet-based graphical user interface accessible by users. In one embodiment, Netscape web server, IBM® Websphere® Internet tools suite, an IBM DB2, universal database platform and a Sybase database platform are used in conjunction with a Sun Solaris operating system platform. (IBM and WebSphere are trademarks of International Business Machines Corporation, registered in many jurisdictions worldwide.) Additionally, components such as JBDC drivers, IBM connection pooling and IBM MQ series connection methods may be used to provide data access to several sources. The term webpage as it is used herein is not meant to limit the type of documents and applications that might be used to interact with the user. For example, a typical website might include, in addition to standard HTML documents, various forms, JAVA applets, JAVASCRIPT, active server pages (ASP), JAVA Server Pages (JSP), common gateway interface scripts (CGI), extensible markup language (XML), dynamic HTML, cascading style sheets (CSS), helper applications, plug-ins, and the like. (Java and JavaScript are trademarks of Oracle Corporation.)

Due to the amount of information in digital communications it is difficult to avoid disclosing sensitive or confidential information. Even when users of electronic communication are educated about protecting confidential information and minimizing exposure of sensitive data, such confidential information may be accidentally sent.

While this specification contains many specifics, these should not be construed as limitations on the scope of the invention or of what can be claimed, but rather as descriptions of features specific to particular implementations of the invention. Certain features that are described in this specification in the context of separate implementations can also be implemented in combination in a single implementation. Conversely, various features that are described in the context of a single implementation can also be implemented in multiple implementations separately or in any suitable sub combination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

Those skilled in the art having read this disclosure will recognize that changes and modifications may be made to the embodiments without departing from the scope of the present invention.

It should be appreciated that the particular implementations shown and described herein are illustrative of the invention and its best mode and are not intended to otherwise limit the scope of the present invention in any way. Other variations are within the scope of the following claims.

The actions recited in the claims can be performed in a different order and still achieve desirable results. Likewise, the processes depicted in the accompanying figures do not necessarily require the particular order shown, or sequential order, to achieve desirable results. In certain implementations, multitasking and parallel processing can be advantageous.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims.

As used herein, the terms comprises, comprising, or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as essential or critical.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for preventing unwanted information disclosure in an hierarchical enterprise having levels, the method comprising:

generating, by a computer system, a communications exchange matrix from historical electronic communications;

performing statistical analysis of the communications exchange matrix by a computer system, including statistical analysis of frequency of electronic communications between respective senders and receivers, existing access control rules, sender job function, receiver job function, levels of detail of respective electronic communications, lengths of time intervals during which communications occur between respective senders and receivers, and variations in levels of detail of respective electronic communications;

generating an access control model by a computer system based on the statistical analysis of the communications exchange matrix;

assigning, by a computer system applying the access control model, a risk score for indicating risk of unwanted disclosure of a current electronic communication from a sender to a receiver of the current electronic communication, wherein networked computer readable storage media of the enterprise has respective storage areas for the respective enterprise levels, each storage area having information belonging to the respective storage area's enterprise level, wherein at least one of the sender and the receiver have at least one access control level that indicates at least one of the enterprise levels of storage area information to which at least one of the sender and receiver has authorized access, wherein the model generates the risk score responsive to an identity of the sender and an identity of the receiver and responsive to the at least one access control level and responsive to the enterprise level of a position of at least one of the sender and receiver; and blocking automatically, by the computer system, transmission of the current electronic communication from the sender to the receiver responsive to whether the risk score for the sender and receiver exceeds a predetermined threshold unless manual input permitting the transmission is received by the computer system from at least the sender.

2. The method of claim 1, comprising:
sending an alert for the current electronic communication by the computer system to at least one of the sender and the receiver of the current electronic communication;
receiving, an authorization to release the current electronic communication for transmission to the receiver from the at least one of the sender and the receiver of the current electronic communication; and
releasing, by the computer system, the current electronic communication for transmission to the receiver of the current electronic communication responsive to receiving the authorization from the at least one of the sender and the receiver of the current electronic communication.

3. The method of claim 1, comprising:
storing respective risk scores in the communications exchange matrix for the respective historical electronic communications.

4. The method of claim 3, wherein applying the access control model includes looking up a risk score in the communication exchange matrix for a current electronic communication.

5. A system for preventing unwanted information disclosure in an enterprise for which networked computer readable storage media has storage areas with respective classification levels, the system comprising:
a processor; and
a computer readable storage medium connected to the processor, wherein the computer readable storage medium has stored thereon a program for controlling the processor, and wherein the processor is operative with the program to execute the program for:
generating, by a computer system, a communications exchange matrix from historical electronic communications;
performing statistical analysis of the communications exchange matrix by a computer system, including statistical analysis of frequency of electronic communications between respective senders and receivers, existing access control rules, sender job function, receiver job function, levels of detail of respective electronic communications, lengths of time intervals during which communications occur between respective senders and receivers, and variations in levels of detail of respective electronic communications;
generating an access control model by a computer system based on the statistical analysis of the communications exchange matrix;
assigning, by a computer system applying the access control model, a risk score for indicating risk of unwanted disclosure of a current electronic communication from a sender to a receiver of the current electronic communication, wherein networked computer readable storage media of the enterprise has respective storage areas for the respective enterprise levels, each storage area having information belonging to the respective storage area's enterprise level, wherein at least one of the sender and the receiver have at least one access control level that indicates at least one of the enterprise levels of storage area information to which at least one of the sender and receiver has authorized access, wherein the model generates the risk score responsive to an identity of the sender and an identity of the receiver and responsive to the at least one access control level and responsive to the enterprise level of a position of at least one of the sender and receiver; and
blocking automatically, by the computer system, transmission of the current electronic communication from the sender to the receiver responsive to whether the risk score for the sender and receiver exceeds a predetermined threshold unless manual input permitting the transmission is received by the computer system from at least the sender.

6. The system of claim 5, wherein the processor is operative with the program to execute the program for:
sending an alert for the current electronic communication by the computer system to at least one of the sender and the receiver of the current electronic communication;
receiving, an authorization to release the current electronic communication for transmission to the receiver from the at least one of the sender and the receiver of the current electronic communication; and
releasing, by the computer system, the current electronic communication for transmission to the receiver of the current electronic communication responsive to receiving the authorization from the at least one of the sender and the receiver of the current electronic communication.

7. The system of claim 5, wherein the processor is operative with the program to execute the program for:
storing respective risk scores in the communications exchange matrix for the respective historical electronic communications.

8. The system of claim 7, wherein applying the access control model includes looking up a risk score in the communication exchange matrix for a current electronic communication.

9. A computer program product for preventing unwanted information disclosure in an enterprise for which networked computer readable storage media has storage areas with respective classification levels, including a computer readable storage medium having instructions stored thereon for execution by a computer system, wherein the instructions, when executed by the computer system, cause the computer system to implement a method comprising:
generating, by a computer system, a communications exchange matrix from historical electronic communications;
performing statistical analysis of the communications exchange matrix by a computer system, including statistical analysis of frequency of electronic communications between respective senders and receivers, existing access control rules, sender job function, receiver job function, levels of detail of respective electronic communications, lengths of time intervals during which communications occur between respective senders and receivers, and variations in levels of detail of respective electronic communications;
generating an access control model by a computer system based on the statistical analysis of the communications exchange matrix;
assigning, by a computer system applying the access control model, a risk score for indicating risk of unwanted disclosure of a current electronic communication from a sender to a receiver of the current electronic communication, wherein networked computer readable storage media of the enterprise has respective storage areas for the respective enterprise levels, each storage area having information belonging to the respective storage area's enterprise level, wherein at least one of the sender and the receiver have at least one access control level that indicates at least one of the enterprise levels of storage area information to which at least one of the sender and receiver has authorized access, wherein the model generates the risk score responsive to an identity of the sender and an identity of the receiver and responsive to the at least one access control level and responsive to the enterprise level of a position of at least one of the sender and receiver; and blocking automatically, by the computer system, transmission of the current electronic communication from the sender to the receiver responsive to whether the risk score for the sender and receiver exceeds a predetermined threshold unless manual input permitting the transmission is received by the computer system from at least the sender.

10. The computer program product of claim 9, wherein the processor is operative with the program to execute the program for:

sending an alert for the current electronic communication by the computer system to at least one of the sender and the receiver of the current electronic communication;

receiving, an authorization to release the current electronic communication for transmission to the receiver from the at least one of the sender and the receiver of the current electronic communication; and releasing, by the computer system, the current electronic communication for transmission to the receiver of the current electronic communication responsive to receiving the authorization from the at least one of the sender and the receiver of the current electronic communication.

11. The computer program product of claim 9, wherein the processor is operative with the program to execute the program for:

storing respective risk scores in the communications exchange matrix for the respective historical electronic communications.

12. The computer program product of claim 11, wherein applying the access control model includes looking up a risk score in the communication exchange matrix for a current electronic communication.

* * * * *